United States Patent
Xu et al.

(10) Patent No.: US 9,520,758 B1
(45) Date of Patent: Dec. 13, 2016

(54) ENERGY HARVESTER FOR CONVERTING MOTION TO ELECTRICITY USING ONE OR MORE MULTIPLE DEGREE OF FREEDOM PENDULUMS

(71) Applicants: Patrick Xu, Cupertino, CA (US); Run De Zhu, Shanghai (CN); Yu Qing Liu, Hong Kong (CN); Ethan Hu, Cupertino, CA (US); Bocheng Cai, Shanghai (CN)

(72) Inventors: Patrick Xu, Cupertino, CA (US); Run De Zhu, Shanghai (CN); Yu Qing Liu, Hong Kong (CN); Ethan Hu, Cupertino, CA (US); Bocheng Cai, Shanghai (CN)

( * ) Notice: Subject to any disclaimer, the term of this patent is extended or adjusted under 35 U.S.C. 154(b) by 0 days.

(21) Appl. No.: 15/164,875

(22) Filed: May 26, 2016

Related U.S. Application Data

(63) Continuation of application No. 14/854,278, filed on Sep. 15, 2015, now abandoned.

(51) Int. Cl.
*H02K 7/10* (2006.01)
*H02K 7/18* (2006.01)
*F03G 7/08* (2006.01)

(52) U.S. Cl.
CPC ............. *H02K 7/1853* (2013.01); *F03G 7/08* (2013.01)

(58) Field of Classification Search
CPC ............ F03G 3/06; F03G 7/08; H02K 7/1853
USPC ........................................................ 290/1 C
See application file for complete search history.

(56) References Cited

U.S. PATENT DOCUMENTS

| | | | | |
|---|---|---|---|---|
| 3,675,113 A | * | 7/1972 | Bader | F03G 1/00 185/38 |
| 4,016,439 A | * | 4/1977 | Sheridan | H02K 33/14 310/32 |
| 5,707,215 A | * | 1/1998 | Olney | B60C 23/12 152/418 |
| 7,709,970 B2 | * | 5/2010 | Blevins | H02K 7/1853 290/1 C |
| 2004/0196741 A1 | * | 10/2004 | Durr | G04B 47/04 368/91 |
| 2005/0248159 A1 | * | 11/2005 | Seoane | F03G 6/06 290/1 R |
| 2007/0137943 A1 | * | 6/2007 | Duclos | F03G 3/06 185/27 |

(Continued)

*Primary Examiner* — Tulsidas C Patel
*Assistant Examiner* — Thomas Quigley
(74) *Attorney, Agent, or Firm* — Jingming (James) Cai; SAC Attorneys LLP

(57) ABSTRACT

An energy harvester system (EHS) for converting a multiple degree of freedom (MDF) pendulum motion into a rotational motion is provided. The EHS includes a pendulum, a pointing element, and motion control slots (MCSs) enclosed in an external housing. Ambient motion from the external housing generates a MDF pendulum motion in the pendulum. The pointing element is slidably positioned on a rod of the pendulum. The MCSs receive a connector that connects the pointing element to the rod of the pendulum and allow the connector to traverse the MCSs, thereby controlling slidable movement of the pointing element along with the pendulum. When the pendulum moves to first ends of the MCSs, the pointing element slides on the rod to allow a pointer of the pointing element to contact and rotate a gear, thereby converting the MDF pendulum motion into a rotational motion of the gear, which drives an electric generator.

19 Claims, 15 Drawing Sheets

(56) References Cited

U.S. PATENT DOCUMENTS

| | | | |
|---|---|---|---|
| 2009/0200983 A1* | 8/2009 | Dyer | H02J 7/32 320/107 |
| 2010/0237631 A1* | 9/2010 | Yu | F03G 7/10 290/1 R |
| 2011/0133484 A1* | 6/2011 | Cornish | H02K 53/00 290/1 C |
| 2012/0080883 A1* | 4/2012 | Hobdy | F03B 13/20 290/53 |
| 2012/0091709 A1* | 4/2012 | Hobdy | F03B 13/20 290/42 |
| 2014/0300113 A1* | 10/2014 | Bachmann | F03G 7/08 290/1 R |
| 2015/0054285 A1* | 2/2015 | Hobdy | F03B 13/20 290/53 |
| 2015/0233359 A1* | 8/2015 | Holt | F03G 3/06 60/698 |
| 2016/0237992 A1* | 8/2016 | Chicoski | F03G 3/00 |

* cited by examiner

ENERGY HARVESTER FOR CONVERTING MOTION TO ELECTRICITY USING ONE OR MORE MULTIPLE DEGREE OF FREEDOM PENDULUMS

This application is a continuation application of non-provisional patent application Ser. No. 14/854,278 titled "Energy Harvester For Converting Motion To Electricity Using One Or More Multiple Degree Of Freedom Pendulums", filed on Sep. 15, 2015 in United States Patent and Trademark Office.

The specification and drawings of the above referenced application are herein incorporated by reference in their entirety.

BACKGROUND

In an era that emphasizes green technology, technologies relating to energy harvesting are becoming important. There is a need for finding new ways to save and reuse energy, while also making it affordable to do so. Energy harvesting refers to a process of capturing energy from external sources comprising, for example, sunlight, kinetic energy, wind, hydraulics, etc. Energy that is harvested from different sources is typically bountiful, and is present regardless of whether energy harvesting takes place. The harvested energy is typically converted to electricity to power electronic devices. Since energy harvesting does not depend on batteries or power sockets, the harvested energy is used as a power source in multiple different industries and portable electronic devices. For example, users can use the harvested energy to charge portable devices such as smartphones without the need to connect their smartphones to a power socket, thereby allowing the users to charge their smartphones on the go. Other electronic devices, for example, communication radios and flashlights can also use power from energy harvesting technologies in locations such as underground mines, deserts, and remote areas, where power sources are unavailable.

There are many conventional energy harvesting systems which generate electrical energy from mechanical motion, vibrations, etc. For example, a conventional energy harvesting system generates electrical energy from vibrations using piezoelectric materials. The piezoelectric materials create a charge when stressed. With these piezoelectric materials, each generator of 1 cubic centimeter in volume generates up to 0.5 milliwatts and can potentially be used to drive small autonomous devices such as pacemakers, wristwatches, or wireless sensors. Piezoelectric materials based energy harvester systems provide renewable electrical power from arbitrary, non-periodic vibrations. The non-periodic vibrations are obtained, for example, from traffic driving on bridges, machinery operating in industries, and humans moving their limbs. The conventional energy harvesting systems using piezoelectric materials generate insufficient power to power a standard portable electronic device. Further, the piezoelectric materials are expensive. Therefore, there is a need for an improved energy harvesting system that generates optimum electrical energy.

Hence, there is a long felt but unresolved need for an energy harvester system that converts a multiple degree of freedom pendulum motion into a rotational motion for generation of electrical energy to power portable electronic devices.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The energy harvester system disclosed herein addresses the above mentioned need for converting a multiple degree of freedom pendulum motion into a rotational motion for generation of electrical energy to power portable electronic devices. The energy harvester system disclosed herein comprises an external housing, a pendulum housing, a pendulum, a pointing element, and motion control slots. The external housing is defined by multiple walls. The pendulum housing is fixedly attached to one of the walls of the external housing. The pendulum housing comprises opposing walls substantially parallel to each other. The pendulum is positioned between the opposing walls of the pendulum housing. The pendulum is pivotally connected to upper ends of the opposing walls of the pendulum housing via a pivot pin. The pendulum comprises a rod and a mass. The mass of the pendulum is rigidly connected to a distal end of the rod of the pendulum. An ambient motion from one or more of the walls of the external housing generates a multiple degree of freedom pendulum motion in the pendulum, causing the pendulum to move in a first direction and a second direction opposing the first direction. The pointing element is slidably positioned on the rod of the pendulum and is connected to the rod of the pendulum by a connector. The pointing element comprises an elongate member and a pointer. The pointer is positioned on an upper end of the elongate member. The pointing element moves along with the rod of the pendulum. A motion control slot is configured on each of the opposing walls of the pendulum housing to receive the connector that connects the pointing element to the rod of the pendulum and allow the connector to traverse the motion control slots on the opposing walls of the pendulum housing in the first direction and the second direction, thereby controlling slidable movement of the pointing element along with the pendulum. The pointing element slides on the rod of the pendulum in an upward direction to allow the pointer of the pointing element to engageably contact a gear positioned above the pointer within the external housing to rotate the gear, when the pendulum moves to first ends of the motion control slots in the first direction via the connector, thereby converting the multiple degree of freedom pendulum motion of the pendulum into a rotational motion of the gear. The rotational motion of the gear drives an electric generator operably connected to the gear for generation of electrical energy.

In an embodiment, the energy harvester system disclosed herein comprises an external housing and at least two pendulum assemblies. In this embodiment, each of the pendulum assemblies is fixedly attached to the opposing walls of the external housing and is positioned substantially perpendicular to a gear within the external housing. In another embodiment, each of the pendulum assemblies is fixedly attached to the opposing walls of the external housing and is positioned substantially parallel to each other and the gear within the external housing. In these embodiments, each of the pendulum assemblies comprises a pendulum housing, a pendulum, a pointing element, and motion control slots as disclosed above. In these embodiments, an orientation of the motion control slots on the opposing walls of the pendulum housing of one of the pendulum assemblies opposes an orientation of the motion control slots on the opposing walls of the pendulum housing of the other pendulum assembly. The connector of one of the pendulum assemblies traverses to the first ends of the motion control slots in the first direction, while the connector of the other pendulum assembly traverses to the second ends of the motion control slots in the first direction. In these embodiments, the pointing element on the pendulum of each of the pendulum assemblies alternately slides on the rod of the pendulum of a corresponding pendulum assembly in an upward direction to allow the pointer of the pointing element to engageably contact the gear positioned above the pointer alternately to rotate the gear, when the pendulum of each of the pendulum assemblies alternately moves to the first ends of the motion control slots in the first direction via the connector, thereby converting the multiple degree of freedom pendulum motion of the pendulum into the rotational motion of the gear. The rotational motion of the gear drives an electric generator operably connected to the gear for generation of electrical energy.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1:
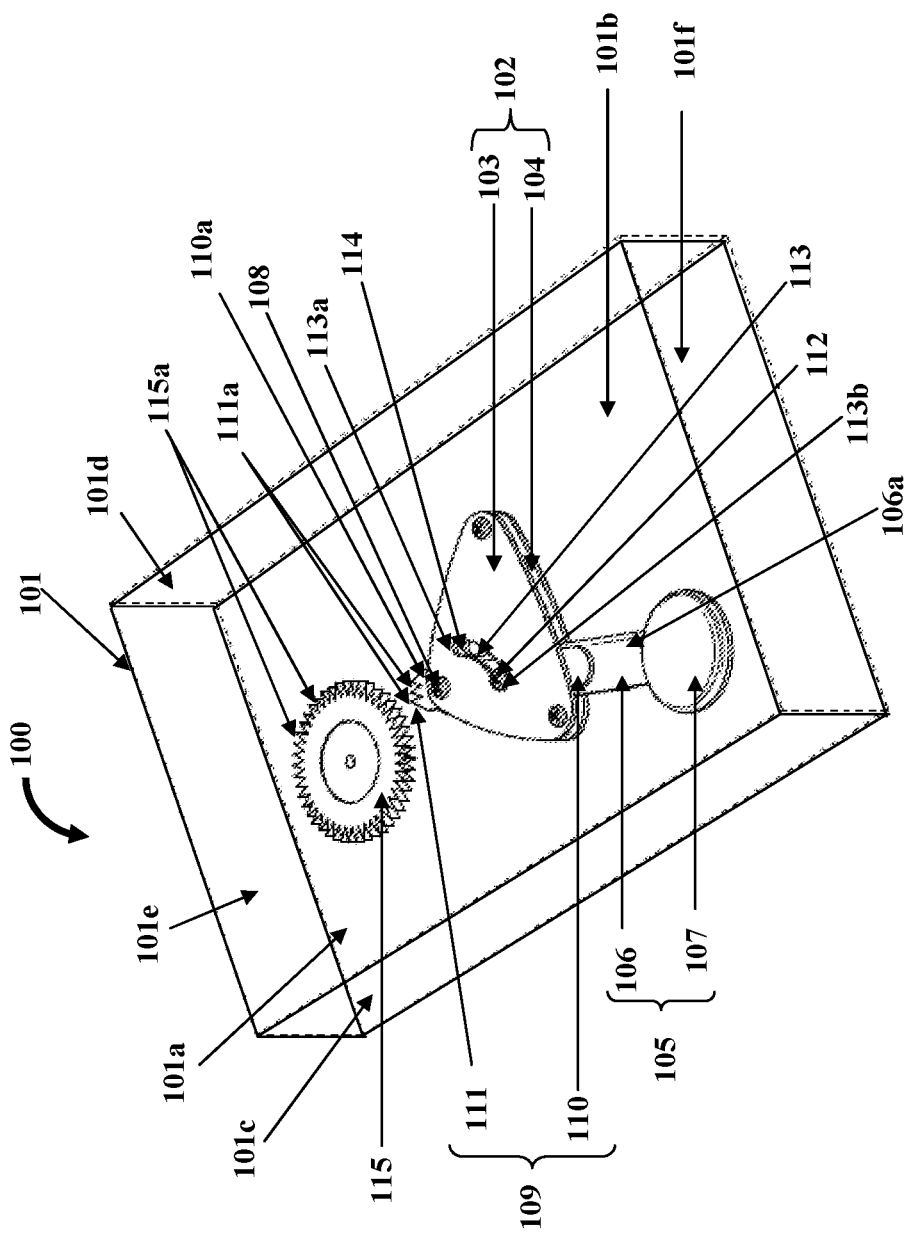
FIG. 1 exemplarily illustrates a perspective view of an energy harvester system for converting a multiple degree of freedom pendulum motion into a rotational motion for generation of electrical energy.

FIG. 1 exemplarily illustrates a perspective view of an energy harvester system 100 for converting a multiple degree of freedom pendulum motion into a rotational motion for generation of electrical energy. The energy harvester system 100 disclosed herein comprises an external housing 101, a pendulum housing 102, a pendulum 105, a pivot pin 108, a pointing element 109, motion control slots 113 and 114, and a connector 112. The external housing 101 of the energy harvester system 100 is defined by multiple walls 101a, 101b, 101c, 101d, 101e, and 101f, for example, a top wall 101b, a bottom wall 101a, a front wall 101f, a rear wall 101e, and side walls 101c and 101d. The external housing 101 encloses the pendulum housing 102. In an embodiment, the external housing 101 is a box of a geometric shape, for example, a cuboidal shape as exemplarily illustrated in FIG. 1. The pendulum housing 102 of the energy harvester system 100 is fixedly attached to one of the walls, for example, the bottom wall 101a of the external housing 101 as exemplarily illustrated in FIG. 1. The pendulum housing 102 comprises opposing walls 103 and 104 substantially parallel to each other.

The pendulum 105 of the energy harvester system 100 is positioned between the opposing walls 103 and 104 of the pendulum housing 102. The pendulum 105 is pivotally connected to the upper ends 103a and 104a of the opposing walls 103 and 104 of the pendulum housing 102 respectively, via the pivot pin 108. The pendulum 105 comprises a rod 106 and a mass 107. The mass 107 of the pendulum 105 is rigidly connected to a distal end 106a of the rod 106 of the pendulum 105. An ambient motion from one or more of the walls 101a, 101b, 101c, 101d, 101e, and 101f, for example, from the bottom wall 101a of the external housing 101, generates a multiple degree of freedom pendulum motion in the pendulum 105, causing the pendulum 105 to move in a first direction and a second direction. For example, the pendulum motion in the pendulum 105 causes the pendulum 105 to move in a right direction and a left direction. As used herein, "ambient motion" refers to motion of the external housing 101 due to a movement of a surface to which the external housing 101 is attached. For example, the external housing 101 can be attached to a wall of a vehicle. In this example, when the vehicle moves, the external housing 101 moves, which in turn, moves the pendulum 105 in the first direction, for example, the right direction, and the second direction, for example, the left direction.

The pointing element 109 of the energy harvester system 100 is slidably positioned on the rod 106 of the pendulum 105 and connected to the rod 106 of the pendulum 105 by the connector 112. The pointing element 109 comprises an elongate member 110 and a pointer 111. The pointer 111 of the pointing element 109 is positioned on an upper end 110a of the elongate member 110 of the pointing element 109. In an embodiment as exemplarily illustrated in FIG. 1, the pointer 111 comprises teeth 111a configured to engage with gear teeth 115a of a gear 115. The pointing element 109 moves along with the rod 106 of the pendulum 105. In an embodiment, the pointing element 109 is positioned substantially perpendicular to the gear 115.

The motion control slots 113 and 114 of the energy harvester system 100 are configured on the opposing walls 103 and 104 of the pendulum housing 102 respectively, to receive the connector 112 that connects the pointing element 109 to the rod 106 of the pendulum 105 and allow the connector 112 to traverse the motion control slots 113 and 114 in the first direction and the second direction, thereby controlling slidable movement of the pointing element 109 along with the pendulum 105. The motion control slots 113 and 114 direct the pointing element 109 positioned on the rod 106 of the pendulum 105 to follow a predetermined path. The motion control slots 113 and 114 comprise first ends 113a and 114a and second ends 113b and 114b respectively, as exemplarily illustrated in FIG. 2. The second ends 113b and 114b of the motion control slots 113 and 114 respectively, are configured to be positioned at a lower position than the first ends 113a and 114a of the motion control slots 113 and 114 respectively.

When the pendulum 105 moves to the first ends 113a and 114a of the motion control slots 113 and 114 respectively, in the first direction via the connector 112, the pointing element 109 slides on the rod 106 of the pendulum 105 in an upward direction to allow the pointer 111 of the pointing element 109 to engageably contact the gear 115 positioned above the pointer 111 within the external housing 101 to rotate the gear 115, thereby converting the multiple degree of freedom pendulum motion of the pendulum 105 into a rotational motion of the gear 115. That is, when the pendulum 105 moves to the first ends 113a and 114a of the motion control slots 113 and 114 respectively, which are at a higher position than the second ends 113b and 114b of the motion control slots 113 and 114 respectively, for example, in a right direction via the connector 112, the motion control slots 113 and 114 slide the pointing element 109 in an upward direction to an extreme high position to allow the pointer 111 of the pointing element 109 to contact and turn the gear 115 connected to an electric generator (not shown), for example, an alternating current (AC) generator. The gear 115 is operably connected to the electrical generator. The rotational motion of the gear 115 drives the electric generator for generation of electrical energy.

When the pendulum 105 moves to the second ends 113b and 114b of the motion control slots 113 and 114 respectively, in the second direction, for example, the left direction, via the connector 112, the motion control slots 113 and 114 force the pointing element 109 to slide in a downward direction to an extreme low position to disengage the pointer 111 of the pointing element 109 from the gear 115 to preclude an opposing rotation of the gear 115. The left-right movement of the pendulum 105 is therefore translated into a unidirectional motion, that is, the rotational motion of the gear 115. The energy harvester system 100 therefore converts mechanical motion, for example, the multiple degree of freedom pendulum motion induced by movement of a vehicle to a rotational motion of the gear 115, which drives the electric generator.

Energy required to drive the electric generator for generation of electrical energy depends on a ratio of a distance between the pivot pin 108 and the mass 107 of the pendulum 105 to a distance between the pivot pin 108 and the gear teeth 115a of the gear 115. In the energy harvester system 100 exemplarily illustrated in FIG. 1, this ratio is, for example, about 50. If the ratio of the distance between the pivot pin 108 and the mass 107 of the pendulum 105 to the distance between the pivot pin 108 and the gear teeth 115a is 50, the force exerted by the mass 107 of the pendulum 105 is amplified 50 times when delivered to the gear 115, thereby driving the electric generator, which typically requires a large amount of energy. Since a large force is delivered to the gear teeth 115a, one left-right movement of the pendulum 105 pushes the gear 115 multiple teeth 115a forward, which drives the electric generator. The energy harvester system 100 therefore harvests energy from mechanical motion, and optimally converts the harvested energy to drive the gear 115 of the electric generator.

In an embodiment, the energy harvester system 100 and the electric generator is packaged in the external housing 101, for example, an electric box of size 2×6×10 cm³ weighing less than about 300 grams to produce more than about 100 milliwatts (mW) of power with a potential to output, for example, 5V and 100 mA, totaling to 500 mW of power. This power is, for example, used to charge batteries of portable electronic devices.

Figure 2:
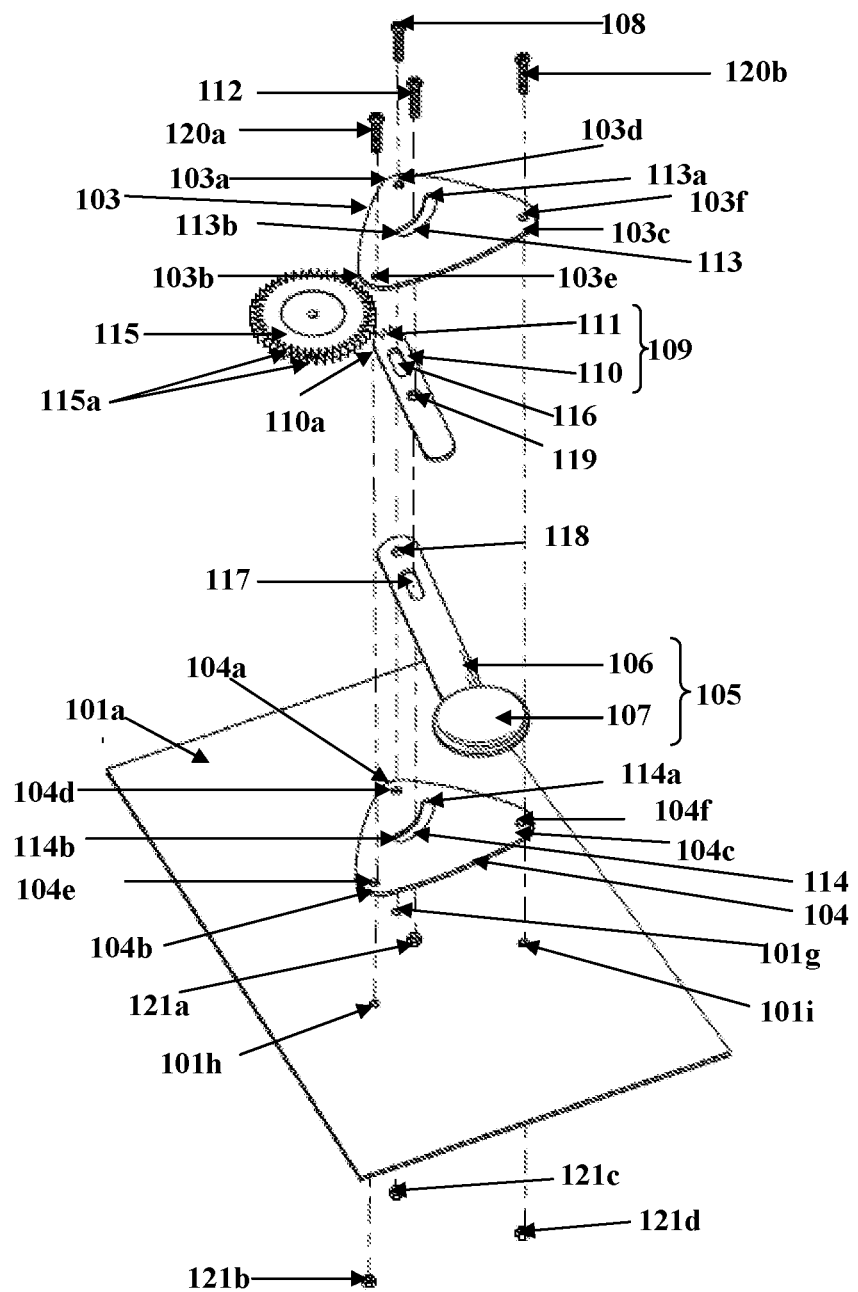
FIG. 2 exemplarily illustrates an exploded view of the energy harvester system.

FIG. 2 exemplarily illustrates an exploded view of the energy harvester system 100. As exemplarily illustrated in FIG. 2, the energy harvester system 100 disclosed herein comprises the pendulum housing 102 with two opposing walls 103 and 104, the pendulum 105 with the rod 106 and the mass 107, the pointing element 109 with the elongate member 110 and the pointer 111 that engages to the gear 115, the pivot pin 108, and the connector 112 as disclosed in the detailed description of FIG. 1. One opposing wall 103 of the pendulum housing 102 exemplarily illustrated in FIG. 1, comprises an opening 103d at the upper end 103a of the wall 103 and openings 103e and 103f at the two corners 103b and 103c of the wall 103 respectively, while the other opposing wall 104 of the pendulum housing 102 comprises an opening 104d at the upper end 104a of the wall 104 and openings 104e and 104f at the two corners 104b and 104c of the wall 104 respectively. Fasteners 120a and 120b are inserted into the openings 103e, 104e and 103f, 104f respectively, of the opposing walls 103 and 104 to fasten the opposing walls 103 and 104 of the pendulum housing 102 together, for example, using nuts 121b and 121d. The fasteners 120a and 120b are, for example, bolts for fastening the opposing walls 103 and 104 of the pendulum housing 102 using the nuts 121b and 121d respectively. The fasteners 120a and 120b pass through the openings 103e, 104e and 103f, 104f respectively, of the opposing walls 103 and 104, and then through the openings 101h and 101i of the bottom wall 101a of the external housing 101 exemplarily illustrated in FIG. 1, to be fastened, for example, using the nuts 121b and 121d.

As exemplarily illustrated in FIG. 2, the pendulum 105 further comprises a slot 117 and an opening 118 positioned on the rod 106 of the pendulum 105. The slot 117 is configured to receive the connector 112 that connects the pointing element 109 to the rod 106 of the pendulum 105 to allow the connector 112 to traverse the motion control slots 113 and 114 of the opposing walls 103 and 104 of the pendulum housing 102 respectively, and move the pointing element 109 along with the rod 106 of the pendulum 105. The pointer 111 of the pointing element 109 is positioned on the upper end 110a of the elongate member 110 of the pointing element 109. The pointing element 109 further comprises a slot 116 and an opening 119 positioned on the elongate member 110 of the pointing element 109. The slot 116 is configured to receive the pivot pin 108 that pivots the pendulum 105 to the pendulum housing 102 to allow the pointing element 109 to slide on the rod 106 of the pendulum 105. The pivot pin 108 is configured to pass through the opening 103d at the upper end 103a of one wall 103 of the pendulum housing 102, the slot 116 of the pointing element 109, the opening 118 of the pendulum 105, and the opening 104d at the upper end 104a of the other wall 104 of the pendulum housing 102. The inserted pivot pin 108 is then fastened through an opening 101g in the bottom wall 101a of the external housing 101, for example, using a nut 121c. The connector 112 is configured to pass through the motion control slot 113 of one wall 103 of the pendulum housing 102, the opening 119 of the pointing element 109, the slot 117 of the pendulum 105, and the motion control slot 114 of the other wall 104 of the pendulum housing 102. The inserted connector 112 is then fastened to the other wall 104 of the pendulum housing 102, for example, using a nut 121a.

Figure 3A:
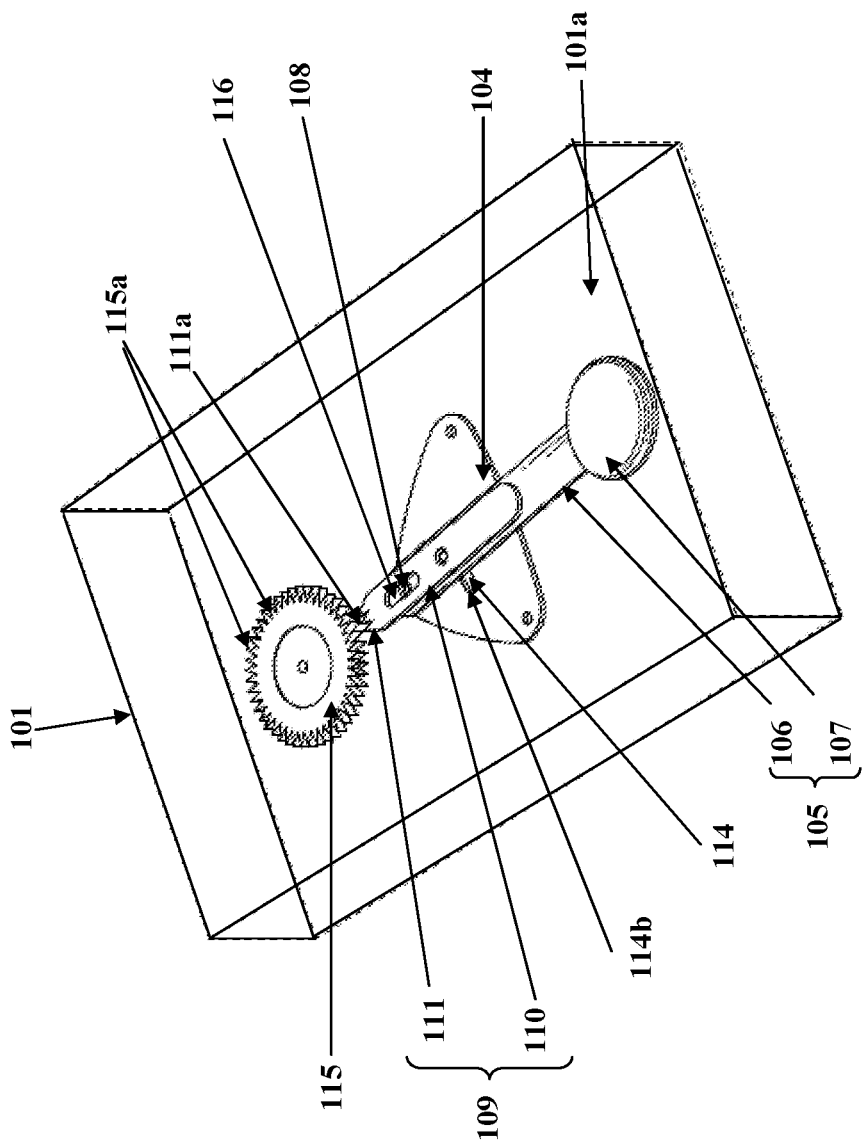
FIGS. 3A-3D exemplarily illustrate perspective views of the energy harvester system, showing a cutaway pendulum housing with one wall to illustrate an operation of the energy harvester system for converting a multiple degree of freedom pendulum motion into a rotational motion.
Figure 3B:
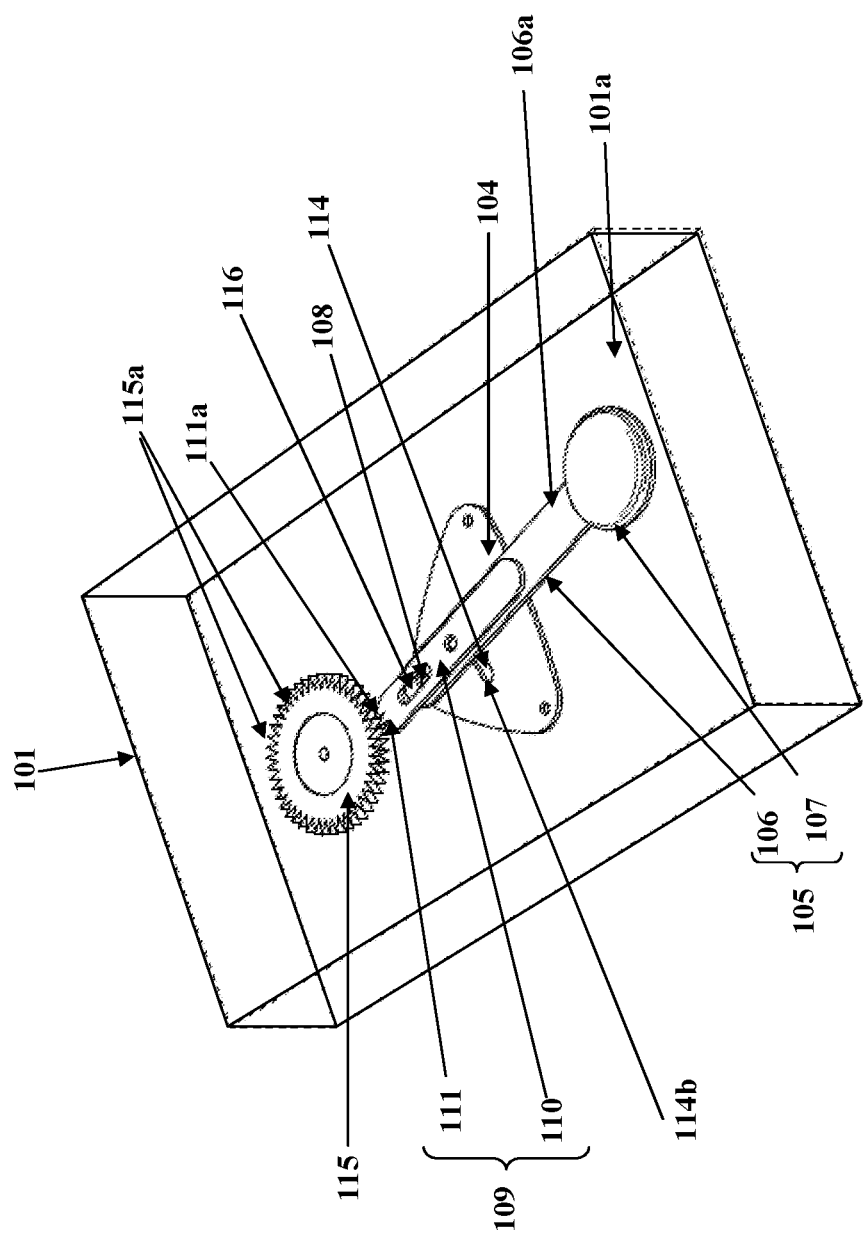
Figure 3C:
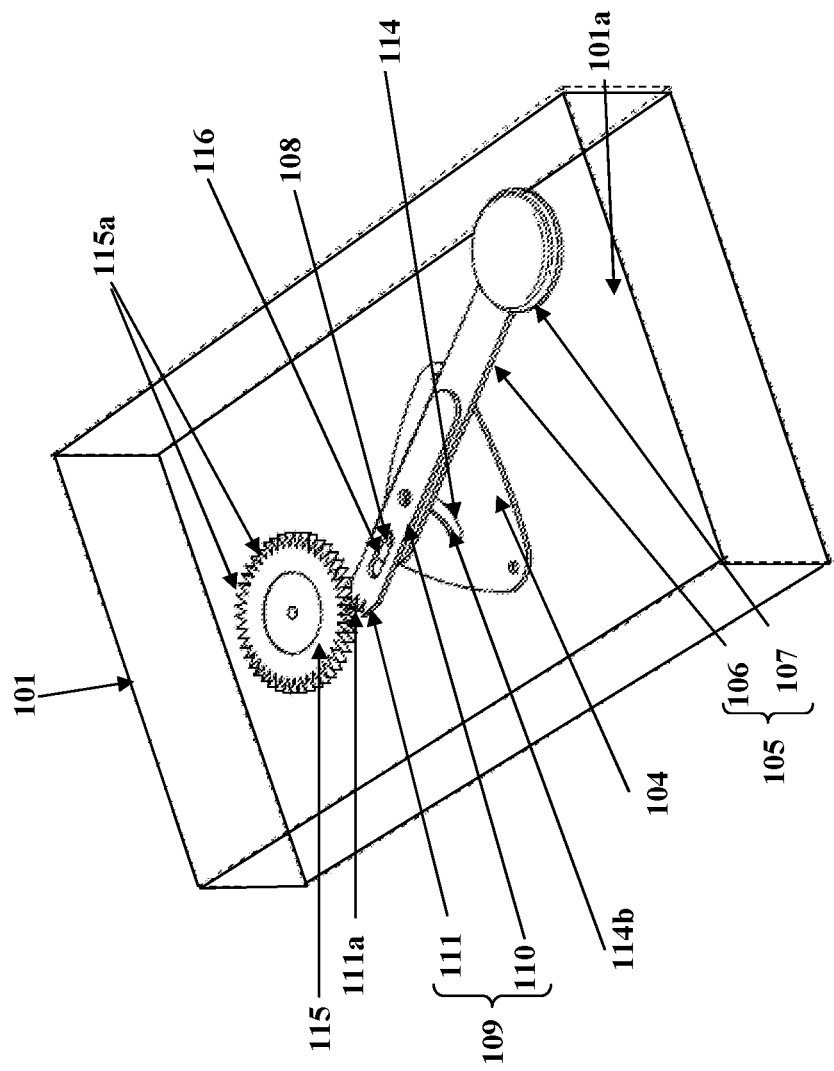

FIGS. 3A-3C exemplarily illustrate perspective views of the energy harvester system 100, showing a cutaway pendulum housing 102 shown in FIG. 1, with one wall, for example, 104 to illustrate an operation of the energy harvester system 100 for converting a multiple degree of freedom pendulum motion into a rotational motion. The pendulum 105 is at an equilibrium position when there is no pendulum motion as exemplarily illustrated in FIG. 3A. An ambient motion, for example, from the bottom wall 101a of the external housing 101 generates a multiple degree of freedom pendulum motion in the pendulum 105, which moves the pendulum 105 in a first direction, for example, a right direction towards the first ends 113a and 114a of the motion control slots 113 and 114 respectively, and in a second direction, for example, a left direction towards the second ends 113b and 114b of the motion control slots 113 and 114 respectively. The pointing element 109 moves along with the rod 106 of the pendulum 105 in the first direction and the second direction. As exemplarily illustrated in FIG. 3B, when the pendulum 105 moves towards the first ends 113a and 114a of the motion control slots 113 and 114 respectively, in the first direction, for example, the right direction via the connector 112 exemplarily illustrated in FIGS. 1-2, the pointing element 109 slidably positioned on the rod 106 of the pendulum 105 slides on the rod 106 of the pendulum 105 via the slot 116 in an upward direction towards the gear 115 to allow the pointer 111 of the pointing element 109 to contact the gear 115.

Figure 3D:
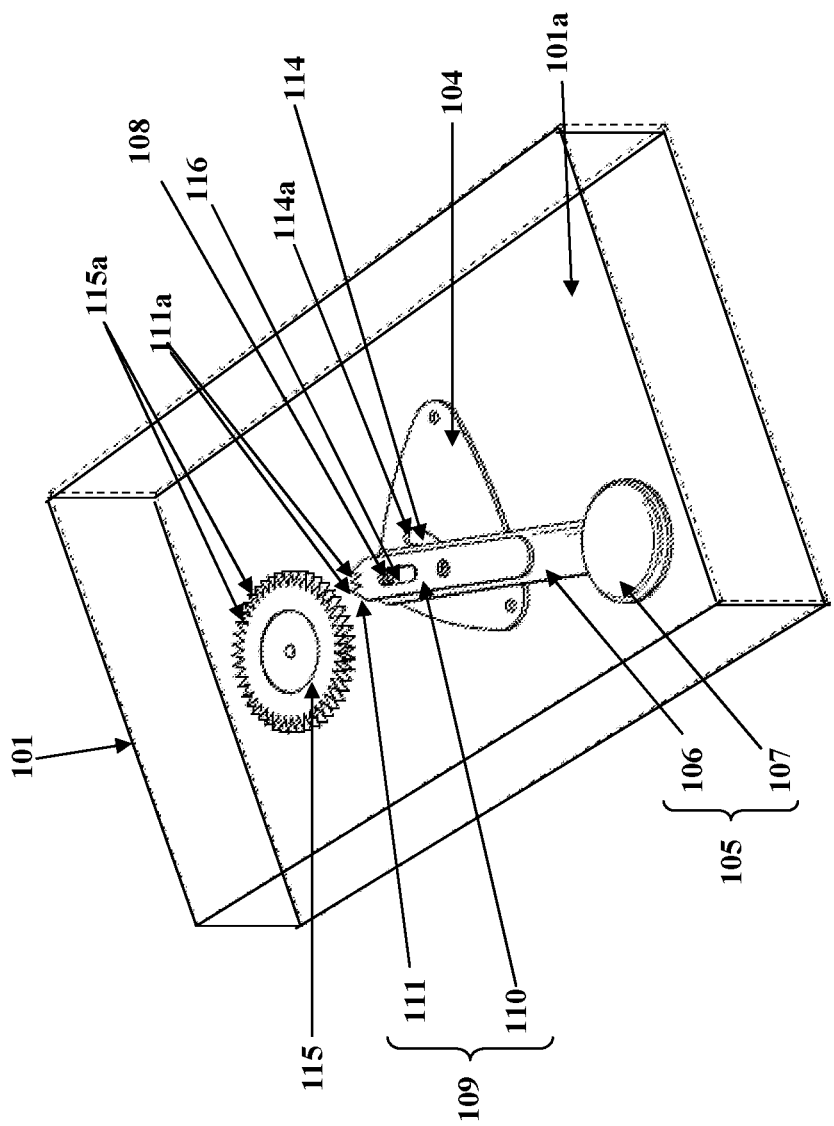

When the pendulum 105 reaches the extreme high position at the first ends 113a and 114a of the motion control slots 113 and 114 respectively, the teeth 111a of the pointer 111 of the pointing element 109 engageably contacts the gear teeth 115a and moves in a second direction, for example, the left direction to rotate the gear 115 as exemplarily illustrated in the FIG. 3C, thereby converting the multiple degree of freedom pendulum motion of the pendulum 105 into a rotational motion of the gear 115. The rotational motion of the gear 115 is used to drive an electric generator (not shown) that generates electrical energy or electricity. When the pendulum 105 moves towards the second ends 113b and 114b of the motion control slots 113 and 114 respectively, in the second direction, for example, the left direction via the connector 112 as exemplarily illustrated in FIG. 3D, the pointing element 109 slidably positioned on the rod 106 of the pendulum 105 slides on the rod 106 of the pendulum 105 via the slot 116 in a downward direction, disengages the teeth 111a of the pointer 111 from the gear teeth 115a to preclude an opposing rotation of the gear 115, and moves in a first direction, for example, the right direction.

Figure 4:
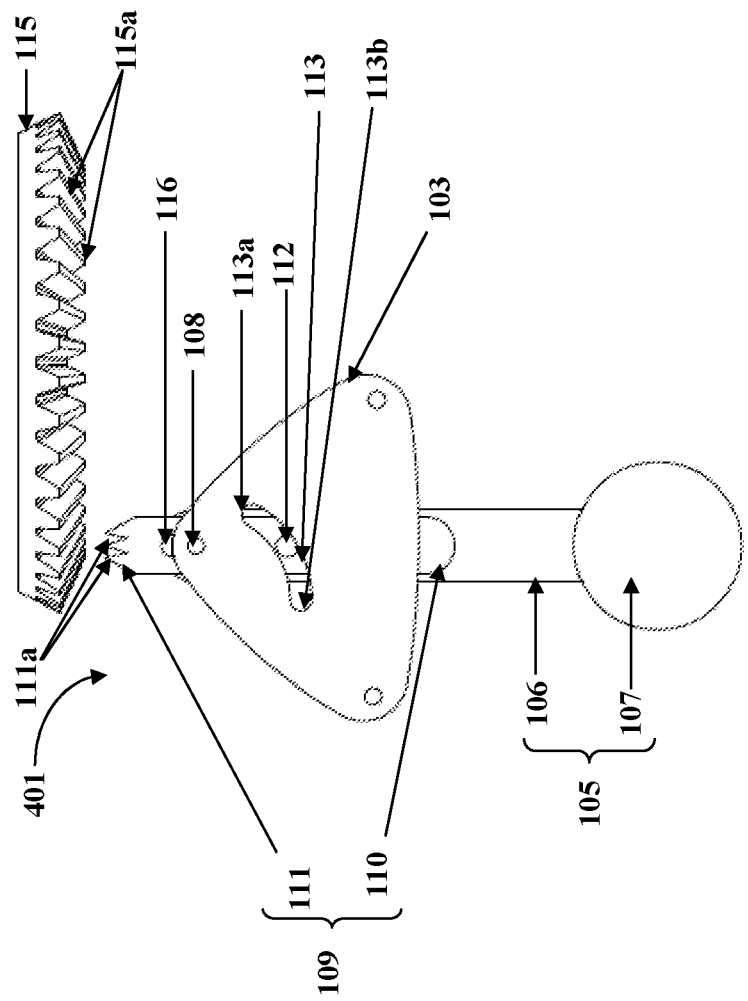
FIG. 4 exemplarily illustrates an elevation view of an embodiment of the energy harvester system, showing a pendulum assembly with a bow shaped motion control slot, positioned perpendicular to a gear.

FIG. 4 exemplarily illustrates an elevation view of an embodiment of the energy harvester system 100, showing a pendulum assembly 401 with a bow shaped motion control slot 113, positioned perpendicular to a gear 115. In an embodiment, the pendulum assembly 401 comprising the pendulum housing 102, the pendulum 105, the pointing element 109, the pivot pin 108, the motion control slots 113 and 114, and the connector 112 is positioned substantially perpendicular to the gear 115 as exemplarily illustrated in FIG. 4. Furthermore, in an embodiment, the motion control slots 113 and 114 of a bow shape are carved on the opposing walls 103 and 104 of the pendulum housing 102 respectively, as exemplarily illustrated in FIG. 2. When a multiple degree of freedom pendulum motion is generated in the pendulum 105, the connector 112 traverses the bow shaped motion control slots 113 and 114 towards the first ends 113a and 114a of the bow shaped motion control slots 113 and 114 respectively, in a first direction, for example, the right direction, and towards the second ends 113b and 114b of the bow shaped motion control slots 113 and 114 respectively, in a second direction, for example, the left direction.

When the pendulum 105 moves towards the first ends 113a and 114a of the bow shaped motion control slots 113 and 114 respectively, in the first direction, for example, the right direction via the connector 112, the pointing element 109 positioned on the rod 106 of the pendulum 105 slides on the rod 106 of the pendulum 105 via the slot 116 in an upward direction and moves towards the gear 115 positioned perpendicularly above the pointing element 109. When the pendulum 105 reaches the extreme high position at the first ends 113a and 114a of the bow shaped motion control slots 113 and 114 respectively, the teeth 111a of the pointer 111 of the pointing element 109 engageably contacts the gear teeth 115a and moves the pointing element 109 in a second direction, for example, the left direction, thereby rotating the gear 115 and converting the multiple degree of freedom pendulum motion of the pendulum 105 into a rotational motion of the gear 115.

Figure 5:
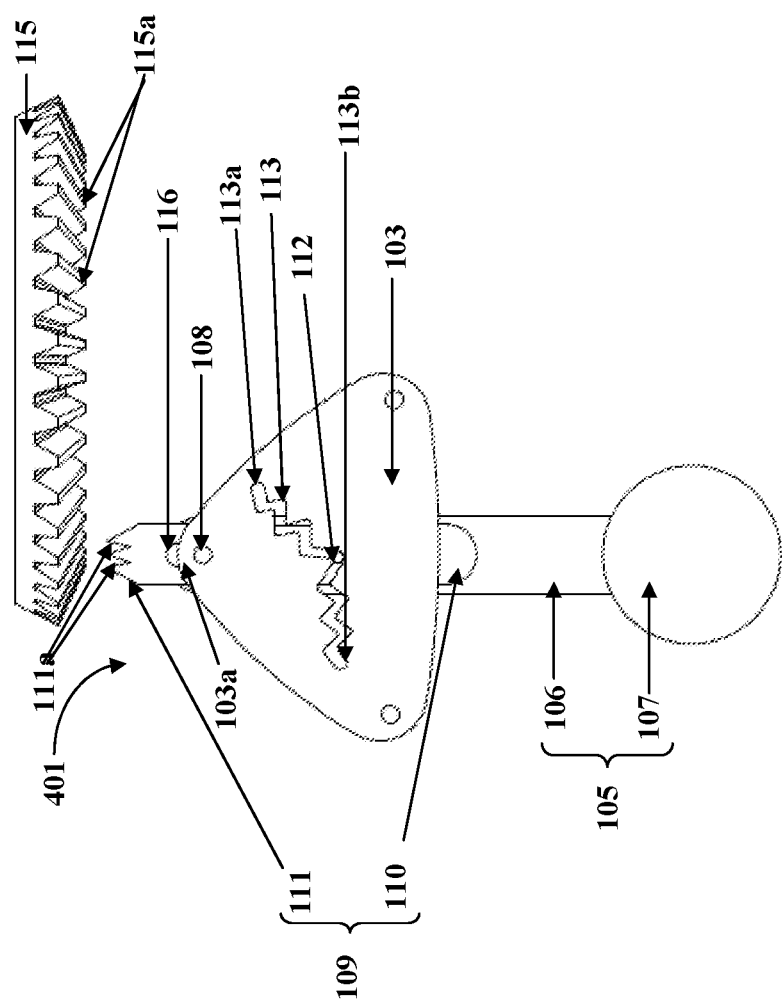
FIG. 5 exemplarily illustrates an elevation view of an embodiment of the energy harvester system, showing a pendulum assembly with a zigzag shaped motion control slot, positioned perpendicular to a gear.

FIG. 5 exemplarily illustrates an elevation view of an embodiment of the energy harvester system 100, showing a pendulum assembly 401 with a zigzag shaped motion control slot 113, positioned perpendicular to a gear 115. As exemplarily illustrated in FIG. 5, in an embodiment, the pendulum assembly 401 comprising the pendulum housing 102, the pendulum 105, the pointing element 109, the pivot pin 108, the motion control slots 113 and 114, and the connector 112 is positioned substantially perpendicular to the gear 115. Furthermore, in an embodiment, the motion control slots 113 and 114 of a zigzag shape are carved in the opposing walls 103 and 104 of the pendulum housing 102 respectively, as exemplarily illustrated in FIG. 2. When a multiple degree of freedom pendulum motion is generated in the pendulum 105, the connector 112 traverses the zigzag shaped motion control slots 113 and 114 in a zigzag manner, that is, the connector 112 traverses through the sharp turns of the zigzag shaped motion control slots 113 and 114 in an upward-downward manner, towards the first ends 113a and 114a of the zigzag shaped motion control slots 113 and 114 respectively, in a first direction, for example, the right direction, and towards the second ends 113b and 114b of the zigzag shaped motion control slots 113 and 114 respectively, in a second direction, for example, the left direction. The pendulum 105 follows an up and down motion directed by the zigzag shaped motion control slots 113 and 114. The zigzag shaped motion control slots 113 and 114 allow the pointer 111 of the pointing element 109 to turn multiple gear teeth 115a of the gear 115.

When the pendulum 105 moves towards the first ends 113a and 114a of the zigzag shaped motion control slots 113 and 114 respectively, in the first direction, for example, the right direction via the connector 112, the pointing element 109 positioned on the rod 106 of the pendulum 105 slides on the rod 106 of the pendulum 105 via the slot 116 in an upward direction and moves towards the gear 115 positioned perpendicularly above the pointing element 109. When the pendulum 105 reaches the extreme high position at the first ends 113a and 114a of the zigzag shaped motion control slots 113 and 114 respectively, the teeth 111a of the pointer 111 positioned on the upper end 110a of the elongate member 110 of the pointing element 109 engageably contacts the gear teeth 115a and moves the pointing element 109 in a second direction, for example, the left direction, thereby rotating the gear 115 and converting the multiple degree of freedom pendulum motion of the pendulum 105 into a rotational motion of the gear 115.

Figure 6:
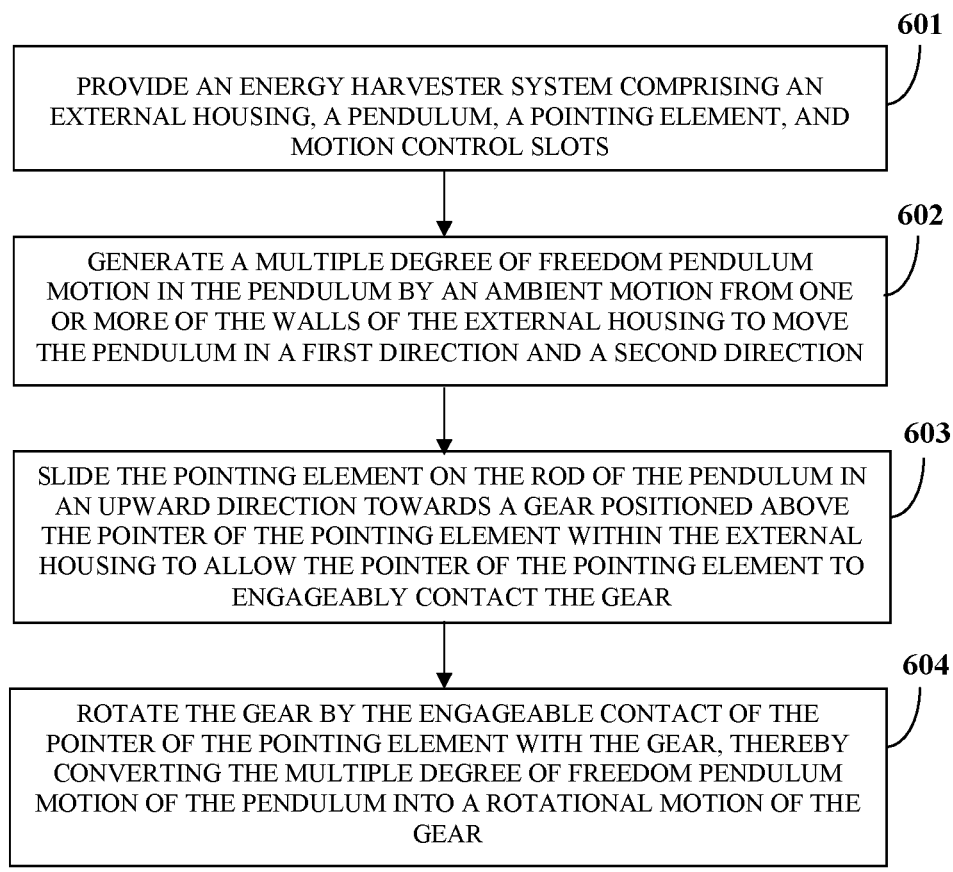
FIG. 6 exemplarily illustrates a method for converting a multiple degree of freedom pendulum motion into a rotational motion for generation of electrical energy using the energy harvester system shown in FIGS. 1-5.

FIG. 6 exemplarily illustrates a method for converting a multiple degree of freedom pendulum motion into a rotational motion for generation of electrical energy using the energy harvester system 100 shown in FIGS. 1-5. In the method disclosed herein, the energy harvester system 100 comprising the external housing 101, the pendulum housing 102, the pendulum 105, the pointing element 109, and the motion control slots 113 and 114 as exemplarily illustrated in FIGS. 1-5 and as disclosed in the detailed description of FIGS. 1-5, is provided 601. An ambient motion from one or more of the walls 101a, 101b, 101c, 101d, 101e, and 101f of the external housing 101 generates 602 a multiple degree of freedom pendulum motion in the pendulum 105 of the energy harvester system 100, causing the pendulum 105 to move in a first direction, for example, a right direction, and a second direction, for example, a left direction opposing the first direction. When the pendulum 105 moves to the first ends 113a and 114a of the motion control slots 113 and 114 respectively, in the first direction via the connector 112, the pointing element 109 slides 603 on the rod 106 of the pendulum 105 via the slot 116 in an upward direction towards a gear 115 positioned above the pointer 111 of the pointing element 109 within the external housing 101 to allow the pointer 111 of the pointing element 109 to engageably contact the gear 115. The engageable contact of the pointer 111 of the pointing element 109 with the gear 115 rotates 604 the gear 115, thereby converting the multiple degree of freedom pendulum motion of the pendulum 105 into a rotational motion of the gear 115, which drives an electric generator (not shown) operably connected to the gear 115 to generate electrical energy.

Figure 7:
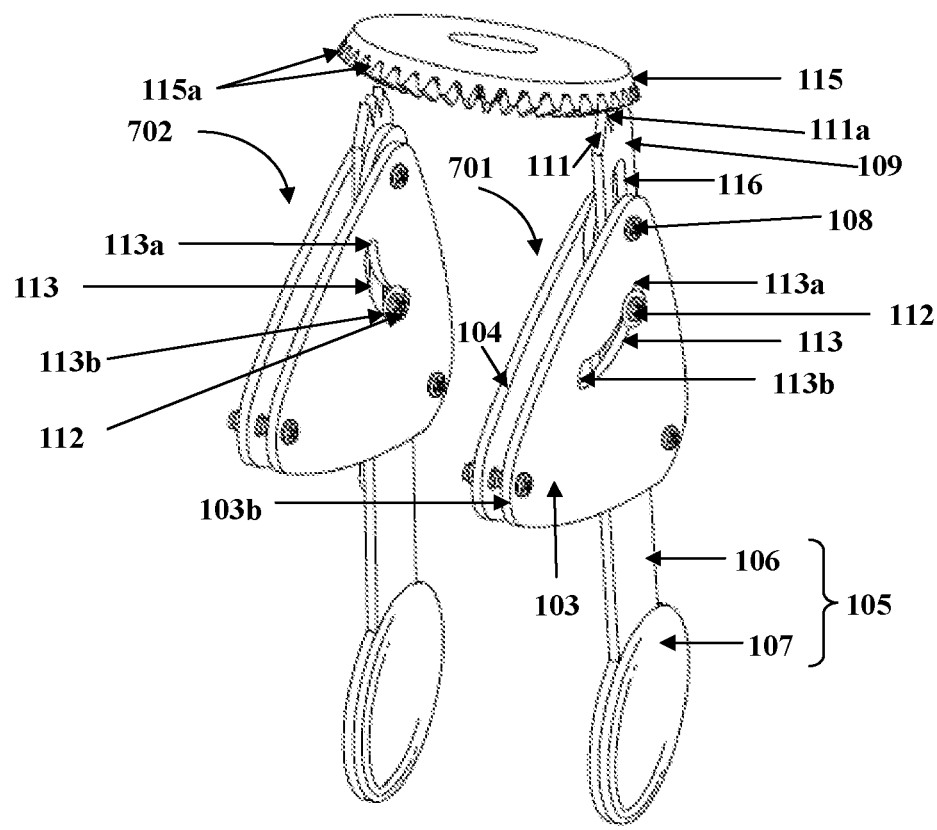
FIG. 7 exemplarily illustrates a perspective view of an embodiment of the energy harvester system comprising two pendulum assemblies positioned substantially perpendicular to a gear.

FIG. 7 exemplarily illustrates a perspective view of an embodiment of the energy harvester system 100 comprising two pendulum assemblies 701 and 702 positioned substantially perpendicular to a gear 115. In this embodiment, the energy harvester system 100 comprises an external housing 101 (not shown in FIG. 7) and at least two pendulum assemblies 701 and 702 fixedly attached to opposing walls, for example, 101a and 101b of the external housing 101. In this embodiment, the two pendulum assemblies 701 and 702 are positioned substantially perpendicular to the gear 115 within the external housing 101. In this embodiment, each of the pendulum assemblies 701 and 702 comprises a pendulum housing 102, a pendulum 105, a pointing element 109, and motion control slots 113 and 114 as disclosed in the detailed description of FIGS. 1-2. Furthermore, in this embodiment, the motion control slots 113 and 114 on the pendulum housings 102 of the two pendulum assemblies 701 and 702 have opposing orientations as exemplarily illustrated in FIG. 7.

The pointing element 109 on the pendulum 105 of each of the two pendulum assemblies 701 and 702 is configured to alternately slide on the rod 106 of the pendulum 105 of a corresponding one of the two pendulum assemblies 701 and 702 via the slot 116 in an upward direction to allow the pointer 111 of the pointing element 109 to engageably contact the gear 115 positioned above the pointer 111 alternately to rotate the gear 115, when the pendulum 105 of each of the two pendulum assemblies 701 and 702 alternately moves to the first ends 113a and 114a of the motion control slots 113 and 114 respectively via the connector 112, thereby converting the multiple degree of freedom pendulum motion of the pendulum 105 into the rotational motion of the gear 115, which drives an electric generator (not shown) for generation of electrical energy.

Figure 8:
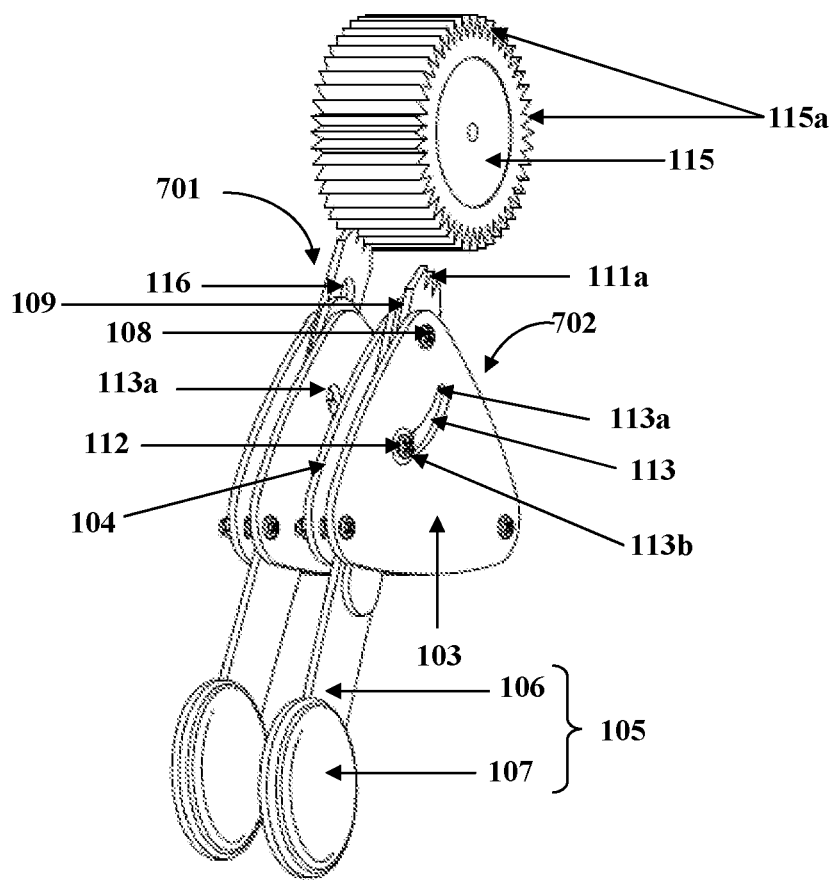
FIG. 8 exemplarily illustrates a perspective view of an embodiment of the energy harvester system comprising two pendulum assemblies positioned substantially parallel to each other and a gear.

FIG. 8 exemplarily illustrates a perspective view of an embodiment of the energy harvester system 100 comprising two pendulum assemblies 701 and 702 positioned substantially parallel to each other and a gear 115. In this embodiment, the energy harvester system 100 comprises an external housing 101 (not shown in FIG. 8) and at least two pendulum assemblies 701 and 702 fixedly attached to opposing walls, for example, 101a and 101b of the external housing 101. In this embodiment, the two pendulum assemblies 701 and 702 are positioned substantially parallel to each other and to the gear 115 within the external housing 101. In this embodiment, the two pendulum assemblies 701 and 702 are positioned parallel to rotate a gear 115 of a large thickness alternately. Each of the pendulum assemblies 701 and 702 comprises a pendulum housing 102, a pendulum 105, a pointing element 109, and motion control slots 113 and 114 as disclosed in the detailed description of FIGS. 1-2. In this embodiment, the motion control slots 113 and 114 on the pendulum housings 102 of the two pendulum assemblies 701 and 702 respectively, have an opposing orientation, with the second ends 113b and 114b of the motion control slots 113 and 114 respectively, positioned at a lower position than the first ends 113a and 114a of the motion control slots 113 and 114 respectively.

The pointing elements 109 on the pendulums 105 of the two pendulum assemblies 701 and 702 are configured to alternately slide on the rods 106 of the pendulums 105 of the corresponding pendulum assemblies 701 and 702 respectively, via the slot 116 in an upward direction to allow the pointers 111 of the pointing elements 109 of the two pendulum assemblies 701 and 702 to engageably contact the gear 115 positioned above the pointers 111 alternately to rotate the gear 115, when the pendulums 105 of the two pendulum assemblies 701 and 702 alternately move to the first ends 113a and 114a of the motion control slots 113 and 114 respectively via the connector 112, thereby converting the multiple degree of freedom pendulum motion of the pendulum 105 into a rotational motion of the gear 115, which drives an electric generator (not shown) operably connected to the gear 115 to generate electrical energy.

In the embodiment exemplarily illustrated in FIG. 8, the pointing elements 109 attached to the rods 106 of the pendulums 105 of the pendulum assemblies 701 and 702 swing continuously as the pendulums 105 swing. The two pointing elements 109 swing to the right alternately while turning the gear 115 due to the opposing orientations of the motion control slots 113 and 114 in the pendulum assemblies 701 and 702, and then swing to the left alternately as the pendulums 105 swing back. Adding the second pendulum assembly 702 with the pointing element 109 makes the energy harvester system 100 generate more electrical energy or electricity, because the second pointing element 109 doubles the number of the gear teeth 115a of the gear 115 turned.

Figure 9:
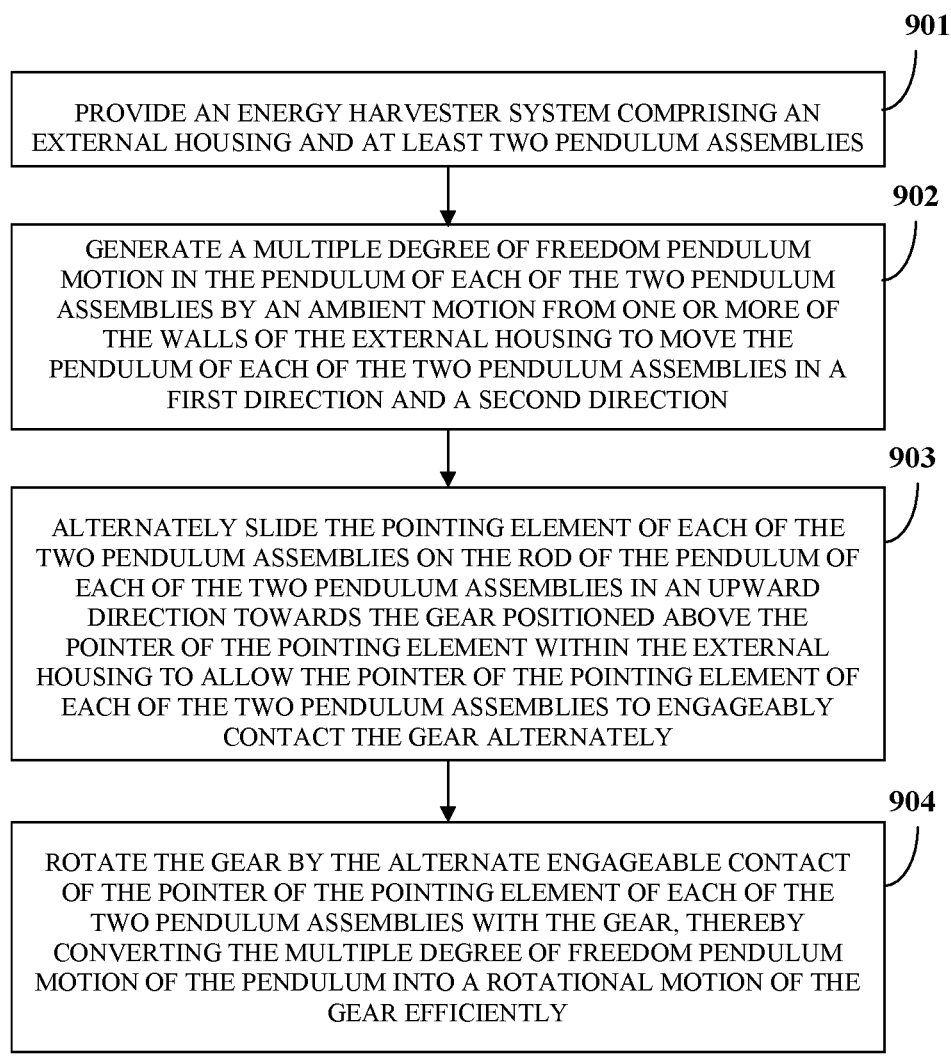
FIG. 9 exemplarily illustrates an embodiment of the method for converting a multiple degree of freedom pendulum motion into a rotational motion for generation of electrical energy using the embodiments of the energy harvester system shown in FIGS. 7-8.

FIG. 9 exemplarily illustrates an embodiment of the method for converting a multiple degree of freedom pendulum motion into a rotational motion for generation of electrical energy using the embodiments of the energy harvester system 100 shown in FIGS. 7-8. In this embodiment of the method disclosed herein, the energy harvester system 100 comprising an external housing 101 (not shown in FIGS. 7-8) and at least two pendulum assemblies 701 and 702 fixedly attached to the opposing walls 101a and 101b of the external housing 101 is provided 901. In the embodiment exemplarily illustrated in FIG. 7, the two pendulum assemblies 701 and 702 are positioned substantially perpendicular to a gear 115 within the external housing 101. In the embodiment exemplarily illustrated in FIG. 8, the two pendulum assemblies 701 and 702 are positioned substantially parallel to each other and the gear 115. The method for converting a multiple degree of freedom pendulum motion into a rotational motion for generation of electrical energy using both the embodiments exemplarily illustrated in FIGS. 7-8 is as follows: An ambient motion from one or more of the walls 101a, 101b, 101c, 101d, 101e, and 101f of the external housing 101 of the energy harvester system 100 generates 902 a multiple degree of freedom pendulum motion in the pendulum 105 of each of the two pendulum assemblies 701 and 702, causing the pendulum 105 of each of the two pendulum assemblies 701 and 702 to move in a first direction, for example, a right direction, and a second direction, for example, a left direction opposing the first direction. When the pendulums 105 of the two pendulum assemblies 701 and 702 exemplarily illustrated in FIG. 7-8, alternately move to the first ends 113a and 114a of their respective motion control slots 113 and 114 in the first direction via their respective connectors 112, the pointing elements 109 of the two pendulum assemblies 701 and 702 alternately slide 903 on the rods 106 of the pendulums 105 of the corresponding two pendulum assemblies 701 and 702 in an upward direction towards the gear 115 positioned above the pointers 111 of the pointing elements 109 within the external housing 101 to allow the pointers 111 of the pointing elements 109 of the pendulum assemblies 701 and 702 to engageably contact the gear 115 alternately.

In an example, in the embodiments exemplarily illustrated in FIGS. 7-8, due to the opposing orientations of the motion control slots 113 and 114 of the two pendulum assemblies 701 and 702, when the pendulums 105 of the two pendulum assemblies 701 and 702 move together in the first direction, for example, the right direction, the connector 112 of one of the two pendulum assemblies 701 and 702 traverses to the first ends 113a and 114a of the motion control slots 113 and 114 respectively, on the opposing walls 103 and 104 of the corresponding pendulum housing 102 in the first direction, while the connector 112 of the other one of the two pendulum assemblies 701 and 702 traverses to the second ends 113b and 114b of the motion control slots 113 and 114 respectively, on the opposing walls 103 and 104 of the corresponding pendulum housing 102 in the first direction. The pointing element 109 of one pendulum assembly 701 therefore slides on the rod 106 of the pendulum 105 of the corresponding pendulum assembly 701 in an upward direction towards the gear 115 positioned above the pointer 111 of the pointing element 109 within the external housing 101 to allow the pointer 111 of the pointing element 109 of that pendulum assembly 701 to engageably contact the gear 115, while the pointing element 109 of the other pendulum assembly 702 slides on the rod 106 of the pendulum 105 of the corresponding pendulum assembly 702 in a downward direction away from the gear 115 to allow the pointer 111 of the pointing element 109 of the other pendulum assembly 702 to disengage from the gear 115 to preclude an opposing rotation of the gear 115. The alternate engageable contact of the pointers 111 of the pointing elements 109 of the pendulum assemblies 701 and 702 with the gear 115 rotates 904 the gear 115, thereby converting the multiple degree of freedom pendulum motion of the pendulum 105 into a rotation motion of the gear 115. The rotational motion of the gear 115 drives an electric generator (not shown) operably connected to the gear 115 for generation of electrical energy.

Figure 10A:
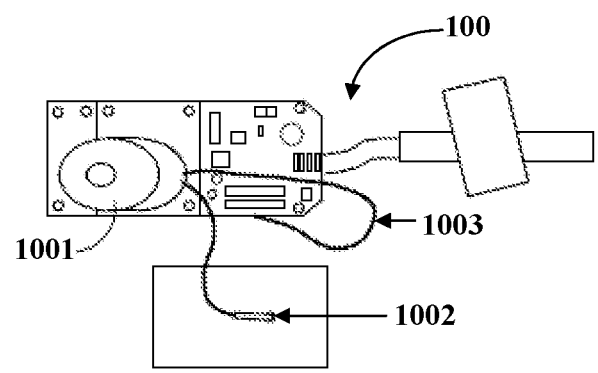
FIGS. 10A-10C exemplarily illustrate an experimental setup of the energy harvester system.
Figure 10B:
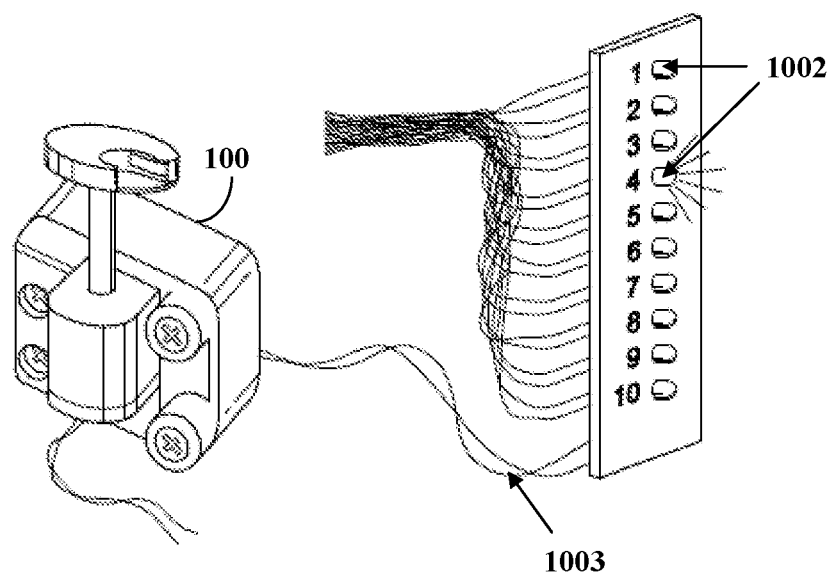
Figure 10C:
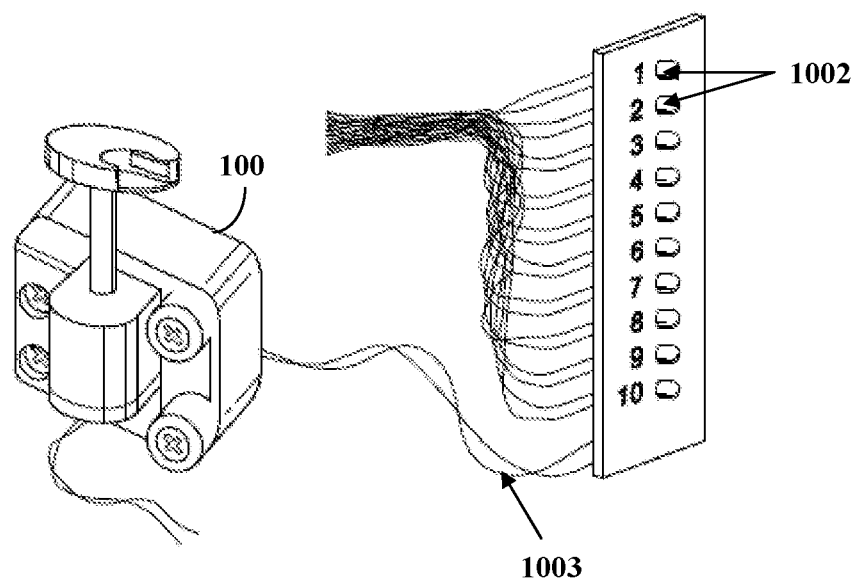

FIGS. 10A-10C exemplarily illustrate an experimental setup of the energy harvester system 100. The energy harvester system 100 disclosed herein converts a multiple degree of freedom pendulum motion to a rotational motion of a gear 115 operably connected to an electric generator, for example, an alternating current (AC) generator 1001 to drive the AC generator 1001. In an experiment, a mini three-phase AC generator 1001 is operably connected to the gear 115 of the energy harvester system 100 exemplarily illustrated in FIG. 1, to generate an output power of, for example, about 3V to 5V and about 100 mA to about 250 mA. The energy harvester system 100 together with the mini three phase AC generator 1001 as exemplarily illustrated in FIG. 10A, is packaged in a box that is attached to a wall of a vehicle to harvest energy from mechanical motion. The output power depends on speed of the energy harvester system 100 during motion of the vehicle. For a low frequency movement of, for example, about 5 Hz, the AC generator 1001 generates a three phase AC output power of, for example, about 50 mW to about 100 mW. The three phase AC output is used to provide an AC load to power devices, for example, a lamp, an electric shaver, etc. A three phase rectifier comprising six diodes can be used to convert the three phase AC output to a direct current (DC). The DC output can then be connected to a Lithium ion (Li+) battery charger.

In another example, the mini three phase alternating current (AC) generator 1001 is used to power a light emitting diode (LED) 1002 of 1.5V and 25 mA via a connecting electric wire 1003 as exemplarily illustrated in FIG. 10A. The AC generator 1001 generates an output power of, for example, about 40 mW. In another example, the energy harvester system 100 is used to drive ten parallel LEDs 1002 with a 3V diode drop and 5 mA, each via a connecting electrical wire 1003 as exemplarily illustrated in FIGS. 10B-10C, to generate a total output power of, for example, about 150 mW.

Figure 11:
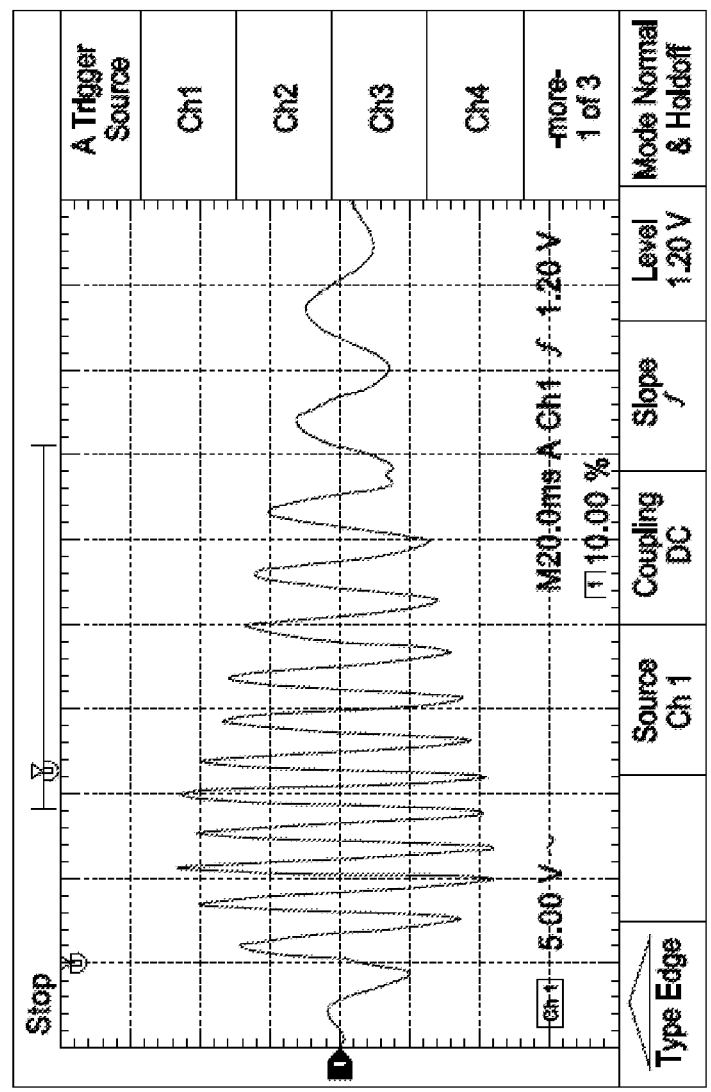
FIG. 11 exemplarily illustrates a graphical representation showing an output of the energy harvester system.

FIG. 11 exemplarily illustrates a graphical representation showing an output of the energy harvester system 100 exemplarily illustrated in FIG. 1. The alternating current (AC) generator 1001 driven by the energy harvester system 100 exemplarily illustrated in FIGS. 10A-10C, which is directly connected to an oscilloscope, outputs a peak voltage of, for example, about +/−10V. The ripples in the graphical representation indicate that one push of the pointer 111 of the pointing element 109 of the energy harvester system 100 on the gear 115 exemplarily illustrated in FIG. 1, can turn the AC generator 1001 multiple times.

The foregoing examples have been provided merely for the purpose of explanation and are in no way to be construed as limiting of the method and the energy harvester system 100 disclosed herein. While the method and the energy harvester system 100 have been described with reference to various embodiments, it is understood that the words, which have been used herein, are words of description and illustration, rather than words of limitation. Further, although the method and the energy harvester system 100 have been described herein with reference to particular means, materials, and embodiments, the method and the energy harvester system 100 are not intended to be limited to the particulars disclosed herein; rather, the method and the energy harvester system 100 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the energy harvester system 100 disclosed herein in their aspects.

We claim:

1. An energy harvester system for converting a multiple degree of freedom pendulum motion into a rotational motion for generation of electrical energy, said energy harvester system comprising:
   an external housing defined by a plurality of walls;
   a pendulum housing fixedly attached to one of said walls of said external housing, said pendulum housing comprising opposing walls substantially parallel to each other;
   a pendulum positioned between said opposing walls of said pendulum housing and pivotally connected to upper ends of said opposing walls of said pendulum housing via a pivot pin, said pendulum comprising a rod and a mass, said mass rigidly connected to a distal end of said rod, wherein an ambient motion from one or more of said walls of said external housing generates said multiple degree of freedom pendulum motion in said pendulum, causing said pendulum to move in a first direction and a second direction opposing said first direction;
   a pointing element slidably positioned on said rod of said pendulum and connected to said rod of said pendulum by a connector, said pointing element comprising an elongate member and a pointer, said pointer positioned on an upper end of said elongate member, said pointing element configured to move along with said rod of said pendulum;
   motion control slots configured on said opposing walls of said pendulum housing to receive said connector that connects said pointing element to said rod of said pendulum and allow said connector to traverse said motion control slots in said first direction and said second direction, thereby controlling slidable movement of said pointing element along with said pendulum; and
   said pointing element further configured to slide on said rod of said pendulum in an upward direction to allow said pointer of said pointing element to engageably contact a gear positioned above said pointer within said external housing to rotate said gear, when said pendulum moves to first ends of said motion control slots in said first direction via said connector, thereby converting said multiple degree of freedom pendulum motion of said pendulum into said rotational motion of said gear, wherein said rotational motion of said gear drives an electric generator operably connected to said gear for said generation of said electrical energy.

2. The energy harvester system of claim 1, further comprising a first slot positioned on said elongate member of said pointing element, wherein said first slot is configured to receive said pivot pin that pivots said pendulum to said pendulum housing to allow said pointing element to slide on said rod of said pendulum.

3. The energy harvester system of claim 1, further comprising a second slot positioned on said rod of said pendulum, wherein said second slot is configured to receive said connector that connects said pointing element to said rod of said pendulum to allow said connector to traverse said motion control slots and move said pointing element along with said rod of said pendulum.

4. The energy harvester system of claim 1, wherein said pointing element is further configured to slide on said rod of said pendulum in a downward direction to disengage said pointer of said pointing element from said gear, when said pendulum moves to second ends of said motion control slots in said second direction via said connector to preclude an opposing rotation of said gear.

5. The energy harvester system of claim 1, wherein said pointing element is positioned substantially perpendicular to said gear.

6. The energy harvester system of claim 1, wherein said pointer of said pointing element comprises teeth configured to engage with gear teeth of said gear.

7. The energy harvester system of claim 1, wherein said motion control slots are bow shaped slots carved on said opposing walls of said pendulum housing.

8. The energy harvester system of claim 1, wherein said motion control slots are zigzag shaped slots carved on said opposing walls of said pendulum housing.

9. The energy harvester system of claim 1, wherein said second ends of said motion control slots are configured to be positioned at a lower position than said first ends of said motion control slots.

10. An energy harvester system for converting a multiple degree of freedom pendulum motion into a rotational motion for generation of electrical energy, said energy harvester system comprising:
    an external housing defined by a plurality of walls; and
    at least two pendulum assemblies fixedly attached to opposing said walls of said external housing and positioned substantially perpendicular to a gear within said external housing, each of said at least two pendulum assemblies comprising:
      a pendulum housing comprising opposing walls substantially parallel to each other;
      a pendulum positioned between said opposing walls of said pendulum housing and pivotally connected to upper ends of said opposing walls of said pendulum housing via a pivot pin, said pendulum comprising a rod and a mass, said mass rigidly connected to a distal end of said rod,
      wherein an ambient motion from one or more of said walls of said external housing generates said multiple degree of freedom pendulum motion in said pendulum causing said pendulum to move in a first direction and a second direction opposing said first direction;
      a pointing element slidably positioned on said rod of said pendulum and connected to said rod of said pendulum by a connector, said pointing element comprising an elongate member and a pointer, said pointer positioned on an upper end of said elongate member, said pointing element configured to move along with said rod of said pendulum; and
      motion control slots configured on said opposing walls of said pendulum housing to receive said connector that connects said pointing element to said rod of said pendulum and allow said connector to traverse said motion control slots in said first direction and said second direction, thereby controlling slidable movement of said pointing element along with said pendulum, wherein an orientation of said motion control slots on said opposing walls of said pendulum housing of one of said at least two pendulum assemblies opposes an orientation of said motion control slots on said opposing walls of said pendulum housing of another one of said at least two pendulum assemblies, wherein said connector of said one of said at least two pendulum assemblies traverses to first ends of said motion control slots in said first direction, and wherein said connector of said another one of said at least two pendulum assemblies traverses to second ends of said motion control slots in said first direction; and said pointing element on said pendulum of said each of said at least two pendulum assemblies further configured to alternately slide on said rod of said pendulum of a corresponding one of said at least two pendulum assemblies in an upward direction to allow said pointer of said pointing element to engageably contact said gear positioned above said pointer alternately to rotate said gear, when said pendulum of said each of said at least two pendulum assemblies alternately moves to said first ends of said motion control slots via said connector, thereby converting said multiple degree of freedom pendulum motion of said pendulum into said rotational motion of said gear, wherein said rotational motion of said gear drives an electric generator operably connected to said gear for said generation of said electrical energy.

11. The energy harvester system of claim 10, further comprising a first slot positioned on said elongate member of said pointing element, wherein said first slot is configured to receive said pivot pin that pivots said pendulum to said pendulum housing to allow said pointing element to slide on said rod of said pendulum.

12. The energy harvester system of claim 10, further comprising a second slot positioned on said rod of said pendulum, wherein said second slot is configured to receive said connector that connects said pointing element to said rod of said pendulum to allow said connector to traverse said motion control slots and move said pointing element along with said rod of said pendulum.

13. The energy harvester system of claim 10, wherein said pointing element of said each of said at least two pendulum assemblies is further configured to alternately slide on said rod of said pendulum in a downward direction to disengage said pointer of said pointing element from said gear, when said pendulum moves to second ends of said motion control slots via said connector to preclude an opposing rotation of said gear.

14. The energy harvester system of claim 10, wherein said second ends of said motion control slots are configured to be positioned at a lower position than said first ends of said motion control slots.

15. An energy harvester system for converting a multiple degree of freedom pendulum motion into a rotational motion for generation of electrical energy, said energy harvester system comprising:

an external housing defined by a plurality of walls; and
at least two pendulum assemblies fixedly attached to opposing said walls of said external housing and positioned substantially parallel to each other and a gear within said external housing, each of said at least two pendulum assemblies comprising:
  a pendulum housing comprising opposing walls substantially parallel to each other;
  a pendulum positioned between said opposing walls of said pendulum housing and pivotally connected to upper ends of said opposing walls of said pendulum housing via a pivot pin, said pendulum comprising a rod and a mass, said mass rigidly connected to a distal end of said rod, wherein an ambient motion from one or more of said walls of said external housing generates said multiple degree of freedom pendulum motion in said pendulum causing said pendulum to move in a first direction and a second direction opposing said first direction;

a pointing element slidably positioned on said rod of said pendulum and connected to said rod of said pendulum by a connector, said pointing element comprising an elongate member and a pointer, said pointer positioned on an upper end of said elongate member, said pointing element configured to move along with said rod of said pendulum; and motion control slots configured on said opposing walls of said pendulum housing to receive said connector that connects said pointing element to said rod of said pendulum and allow said connector to traverse said motion control slots in said first direction and said second direction, thereby controlling slidable movement of said pointing element along with said pendulum, wherein an orientation of said motion control slots on said opposing walls of said pendulum housing of one of said at least two pendulum assemblies opposes an orientation of said motion control slots on said opposing walls of said pendulum housing of another one of said at least two pendulum assemblies, and wherein said connector of said one of said at least two pendulum assemblies traverses to first ends of said motion control slots in said first direction, and wherein said connector of said another one of said at least two pendulum assemblies traverses to second ends of said motion control slots in said first direction; and said pointing element on said pendulum of said each of said at least two pendulum assemblies further configured to alternately slide on said rod of said pendulum of a corresponding one of said at least two pendulum assemblies in an upward direction to allow said pointer of said pointing element to engageably contact a gear positioned above said pointer alternately to rotate said gear, when said pendulum of said each of said at least two pendulum assemblies alternately moves to said first ends of said motion control slots via said connector, thereby converting said multiple degree of freedom pendulum motion of said pendulum into said rotational motion of said gear, wherein said rotational motion of said gear drives an electric generator operably connected to said gear for said generation of said electrical energy.

16. The energy harvester system of claim 15, further comprising a first slot positioned on said elongate member of said pointing element, wherein said first slot is configured to receive said pivot pin that pivots said pendulum to said pendulum housing to allow said pointing element to slide on said rod of said pendulum.

17. The energy harvester system of claim 15, further comprising a second slot positioned on said rod of said pendulum, wherein said second slot is configured to receive said connector that connects said pointing element to said rod of said pendulum to allow said connector to traverse said motion control slots and move said pointing element along with said rod of said pendulum.

18. The energy harvester system of claim 15, wherein said pointing element of said each of said at least two pendulum assemblies is further configured to alternately slide on said rod of said pendulum in a downward direction to disengage said pointer of said pointing element from said gear, when said pendulum moves to second ends of said motion control slots via said connector to preclude an opposing rotation of said gear.

19. The energy harvester system of claim 15, wherein said second ends of said motion control slots are configured to be positioned at a lower position than said first ends of said motion control slots.

* * * * *